(12) United States Patent
Narang et al.

(10) Patent No.: US 7,315,872 B2
(45) Date of Patent: Jan. 1, 2008

(54) DYNAMIC AND SELECTIVE DATA SOURCE BINDING THROUGH A METAWRAPPER

(75) Inventors: Inderpal S. Narang, Saratoga, CA (US); Vijayshankar Raman, San Jose, CA (US); Peter M. Schwarz, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 10/931,002

(22) Filed: Aug. 31, 2004

(65) Prior Publication Data

US 2006/0047721 A1   Mar. 2, 2006

(51) Int. Cl.
*G06F 17/00* (2006.01)
(52) U.S. Cl. .......................................... 707/204; 707/3
(58) Field of Classification Search ................ 707/204, 707/3
See application file for complete search history.

(56) References Cited

U.S. PATENT DOCUMENTS

| | | | | |
|---|---|---|---|---|
| 5,956,706 | A | * | 9/1999 | Carey et al. ................... 707/2 |
| 6,085,186 | A | * | 7/2000 | Christianson et al. .......... 707/3 |
| 6,330,717 | B1 | | 12/2001 | Raverdy et al. |
| 2002/0133504 | A1 | | 9/2002 | Vlahos et al. |
| 2003/0212664 | A1 | | 11/2003 | Breining et al. |

FOREIGN PATENT DOCUMENTS

WO   WO02/31690   4/2002

OTHER PUBLICATIONS

Raman et al. "Data Access and Management Service on Grid", Jul. 4, 2002, downloaded from <https://forge.gridforum.org/sf/docman/do/downloadDocument/projects.dais-wg/docman.root.ggf_documents.ggf5/doc5287;jsessionid=2150D3F3E87654BB28BE8B1FDA455683>.*
Raschid et al., "A Flexible Meta-Wrapper Interface For Autonomous Distributed Information Sources", University of Maryland at College Park, Mar. 1997.*
Ozkan et al., "A Cost Model for Path Expression in Obect-Oriented Queries", Journal of Database Management, summer 1996, v7n3, pp. 25-33.*

(Continued)

*Primary Examiner*—Sana Al-Hashemi
*Assistant Examiner*—Hares Jami
(74) *Attorney, Agent, or Firm*—Gibb & Rahman, LLC (57) ABSTRACT

A system, method, and program storage device implementing the method, for integrating data in a database management system, wherein the method comprises grouping data sources and replicas of the data sources that provide analogous data into a common logical domain; writing application queries against the common logical domain; selecting a correct set of replicas of the data sources and a query-execution strategy for combining a content of the correct set of replicas of the data sources in order to answer the application queries according to query-cost-based optimization; selecting a correct set of data sources according to run-time constraints; shielding the application queries from changes to the data sources by dynamically binding the application queries against the correct sets of data sources and replicas of the data sources; and processing the application queries by generating an optimum query result based on the steps of grouping and shielding.

3 Claims, 6 Drawing Sheets

| | Source 1 | Source 2 | ... | Source n | Provenance Information |
|---|---|---|---|---|---|
| Logical Domain 1 | | | | Data distribution, Schema mapping | Source 13 is a replica of Source 16, with 5 minutes staleness ... ... ... |
| Logical Domain 2 | | | | | |
| ... | | | | | |

↗ 58

OTHER PUBLICATIONS

Braumandl et al., "ObjectGlobe: Ubiquitous Query Processing on the Internet", The VLDB Journal, vol. 10,, 2001, pp. 48-71.

Kossmann, "The State of the Art in Distributed Query Processing", ACM Computing Surveys, vol. 32, No. 4, 2000, pp. 422-469.

Vidal et al., "A Meta-Wrapper for Scaling up to Multiple Autonomous Distributed Information Sources", Proc. 3rd IFCIS International Conf. on Cooperative Info. Systems, 1998, pp. 148-157.

Roth et al., "Don't Scrap It, Wrap It! A Wrapper Architecture for Legacy Data Sources", Proc. 23rd VLDB Conference Athens, Greece, 1997, pp. 266-275.

Hammer et al., "Template-Based Wrappers in the TSIMMIS System", In Proce. of the ACM SIGMOD International Conf. on Management of Data, 1997, pp. 1-4.

Haas et al., "Optimizing Queries Across Diverse Data Sources", Proc. of the 23rd VLDB Conference, 1997, pp. 276-285.

* cited by examiner

| | Source 1 | Source 2 | ... | Source n | Provenance Information |
|---|---|---|---|---|---|
| Logical Domain 1 | | | | Data distribution, Schema mapping | Source 13 is a replica of Source 16, with 5 minutes staleness |
| Logical Domain 2 | | | | | ⋮ |
| ... | | | | | ⋮ |

58

DYNAMIC AND SELECTIVE DATA SOURCE BINDING THROUGH A METAWRAPPER

BACKGROUND OF THE INVENTION

1. Field of the Invention

The embodiments of the invention generally relate to data management systems and methods, and more particularly to data management systems and methods in a distributed or grid computing environment.

2. Description of the Related Art

Many applications involve integrating data from multiple data sources and their replicas distributed across multiple nodes. In a distributed (grid) environment, these data sources can be fairly dynamic in two respects: First, with regard to replication, the data sources can be replicated in whole or in a subset according to the query workloads and the system loads. These new replicas are created and destroyed by independent entities such as the placement manager, independent of the applications accessing the data. Second, with regard to source failure/addition, distributed data sources are often difficult to maintain under a centralized administrative control. As such, new data sources can be independently registered to a grid or may leave the grid. Additionally, the data sources can also fail independently.

Figure 1:
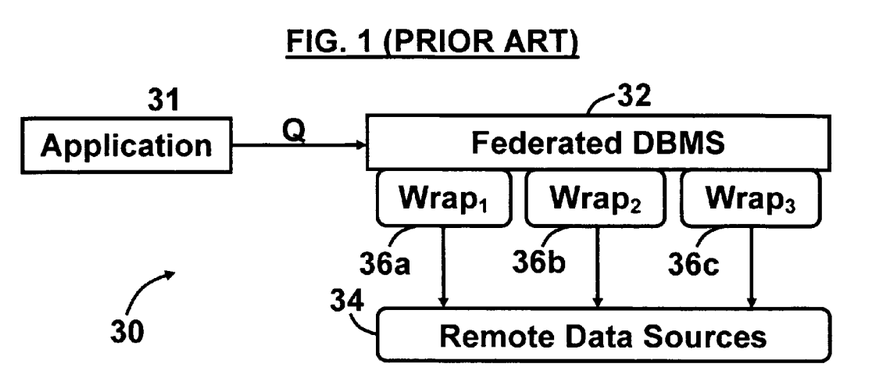
FIG. 1 is a schematic diagram of a conventional query system.

FIG. 1 illustrates a conventional federation through wrappers system 30. Federated DBMSs (data base management systems) 32, which receive queries (Q) from an application 31, typically access remote data sources 34 through specialized connector modules, variously referred to as wrappers or gateways 36a, 36b, 36c. Each wrapper 36a, 36b, 36c encapsulates its corresponding remote data into a tabular structure so that the federated DBMS 32 collates data from the wrappers 36a, 36b, 36c via relational operators. Traditionally, there is one connector module for each remote data source 34.

Conventionally, applications 31 are generally programmed to access specific data sources 34, and so any dynamism at the data source 34 can be tackled only by reprogramming the application 31. For example, SQL (Structured Query Language) applications hardcode the data sources in the nicknames used in their "FROM" clause. Data binding techniques exist, such as those described in Vidal et al., "A Meta-Wrapper for Scaling up to Multiple Autonomous Distributed Information Sources," Proceedings 3rd IFCIS International Conference on Cooperative Information Systems, pp. 148-157, New York, N.Y., 1998, the complete disclosure of which, in its entirety, is herein incorporated by reference.

These techniques tend to bind data sources 34 to a query (Q) and make data sources 34 transparent to applications. However, this binding is performed statically, when the query (Q) is compiled, whereby a description of the capabilities of each data source 34 is statically stored within the DBMS 32. Moreover, the data sources 34 can change or fail after the query (Q) is compiled. Thus, while the conventional data management systems and methods were adequate for the purposes they were designed for, there remains a need for a novel technique of data source binding which includes factors that are unknown at the time the query is compiled.

SUMMARY OF THE INVENTION

In view of the foregoing, an embodiment of the invention provides a method (and program storage device implementing the method) for integrating data in a database management system, wherein the method comprises grouping data sources and replicas of the data sources that provide analogous data into a common logical domain; writing application queries against the common logical domain; selecting a correct set of replicas of the data sources and a query-execution strategy for combining a content of the correct set of replicas of the data sources in order to answer the application queries according to query-cost-based optimization; selecting a correct set of data sources according to run-time constraints; shielding the application queries from changes to the data sources by dynamically binding the application queries against the correct sets of data sources and replicas of the data sources; and processing the application queries by generating an optimum query result based on the steps of grouping and shielding. The data sources and the replicas comprise data distributed in a computer grid environment.

The method further comprises registering a nickname for the common logical domain and summarizing the data sources and the replicas in a metadata repository, wherein the summarizing is performed by a wrapper, wherein the wrapper dynamically contacts the metadata repository to asynchronously retrieve the correct set of data sources and replicas according to query predicates and quality-of-service (QOS) requirements, and wherein the QOS requirements comprise tolerable data staleness factors. Also, the wrapper is adapted to allow a database optimizer to select the optimum query result according to the data source and replica performance, and availability of the data source and the replicas. The method further comprises adapting the correct set of data sources and replicas after execution of the application queries has begun. Moreover, the step of adapting comprises completing the application queries with partially-completed results from available data sources. Additionally, the step of adapting comprises data source performance reduction factors, data source performance failure factors, and a percentage of the query processing that is completed.

Furthermore, the step of adapting comprises completing the processing of the query by automatically switching the data sources to replicas. Also, the step of adapting comprises tracking a provenance of the data sources and replicas used to answer the application queries. The method further comprises storing data regarding alternative non-optimum query execution strategies and sets of replicas of data sources that may become optimal query execution strategies and sets of replicas of data sources after compile time is completed. Moreover, the method further comprises gathering access statistics during execution of the processing to guide future replication of the data.

Another embodiment of the invention provides a method for processing a database query, wherein the method comprises initiating a query in a database management system; accessing data in the database management system, wherein the data is stored in data sources and data source replicas in the database management system; arranging the data sources and the data source replicas into groups of common data sources and data source replicas; selecting a correct set of data sources replicas and a query-execution strategy for combining a content of the correct set of data source replicas in order to answer the query according to query-cost-based optimization; selecting a correct set of data sources according to run-time constraints; dynamically binding the query against the correct sets of data sources and data source replicas; and generating an optimum query result based on the steps of arranging and binding.

Another aspect of the invention provides a system of processing a database query, wherein the system comprises means for grouping data sources and replicas of the data sources that provide analogous data into a common logical domain; means for writing application queries against the common logical domain; means for selecting a correct set of replicas of the data sources and a query-execution strategy for combining a content of the correct set of replicas of the data sources in order to answer the application queries according to query-cost-based optimization; means for selecting a correct set of data sources according to run-time constraints; means for shielding the application queries from changes to the data sources by dynamically binding the application queries against the correct sets of data sources and replicas of the data sources; and means for processing the application queries by generating an optimum query result based on the means for grouping and the means for shielding.

Another embodiment of the invention provides a system of integrating data, wherein the system comprises a database management system adapted to process a query and generate an optimum query result; a wrapper module adapted to receive the query and to send a request for data stored in data sources and data source replicas; and a metadata repository adapted to arrange the data sources and the data source replicas into a list of common data sources and data source replicas, wherein the wrapper module is configured for receiving the list from the metadata repository, wherein the wrapper module is configured for dynamically binding the query against a correct set of data sources and data source replicas, wherein the correct set of data sources are selected according to run-time constraints, and wherein the correct set of data source replicas and a query-execution strategy for combining a content of the correct set of replicas of the data sources in order to answer the application queries are selected according to query-cost-based optimization, and wherein the list and the binding generate the optimum query result.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS OF THE INVENTION

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned, there remains a need for a novel technique of data source binding which includes factors that are unknown at the time the query is compiled. The embodiments of the invention address this need by providing a technique to enhance a federated DBMS to mask applications from the dynamism at the data source and to provide a single system image.

As implemented by the embodiments of the invention a federated database management system (federated DBMS) is a database system that combines information from autonomous and typically heterogeneous data sources. It is in contrast to a "distributed database management system", which traditionally has been used to describe a tightly-coupled system in which the data sources are jointly administered and are all running the same (or very similar) software. As such, the embodiments of the invention use the term "federated DBMS" slightly more specifically, using it to refer to the particular software that is used to make the autonomous data sources appear to be a single database.

A "single system image" exists when multiple cooperating computer systems are made to appear as a single monolithic system to users or applications. Generally, according to the embodiments of the invention, providing a single-system image simplifies application programming.

Specifically, according to embodiments of the invention, the application queries do not specify data sources directly, but instead, the application queries are dynamically bound against the correct set of data sources and replicas at run-time of a query that is submitted to the DBMS by an application. One could envision the determination of which sources will be accessed by a query being made at a number of times. The earliest time would be when the application is being developed (i.e., the sources are explicitly specified in the application code). Or, the application could decide on the sources just prior to submitting the query to the DBMS. Delaying the choice still later, the determination could be left up to the DBMS to decide, "after" the query is submitted by the application. In this case, the DBMS can either make the decisions at "query compilation time" (when an optimized access plan for the query is being developed) or at "run-time", just before the query is executed or perhaps even during query execution. Moreover, the data sources are chosen based on the query predicates, and the replicas are chosen based on the application's staleness tolerance, which is specified as part of its QOS requirement.

"Staleness tolerance" refers to the degree to which an application can tolerate data that is not absolutely up to date; i.e., data that is "stale". Some applications; e.g., seat reservation, do not tolerate stale data well at all since stale data might allow the same seat to be sold twice by mistake. Other applications (e.g., decision support) are only trying to capture a statistical overview of the data and tolerate staleness to a greater degree. Referring now to the drawings, and more particularly to FIGS. 2(A) through 7, there are shown preferred embodiments of the invention.

Figure 2A:
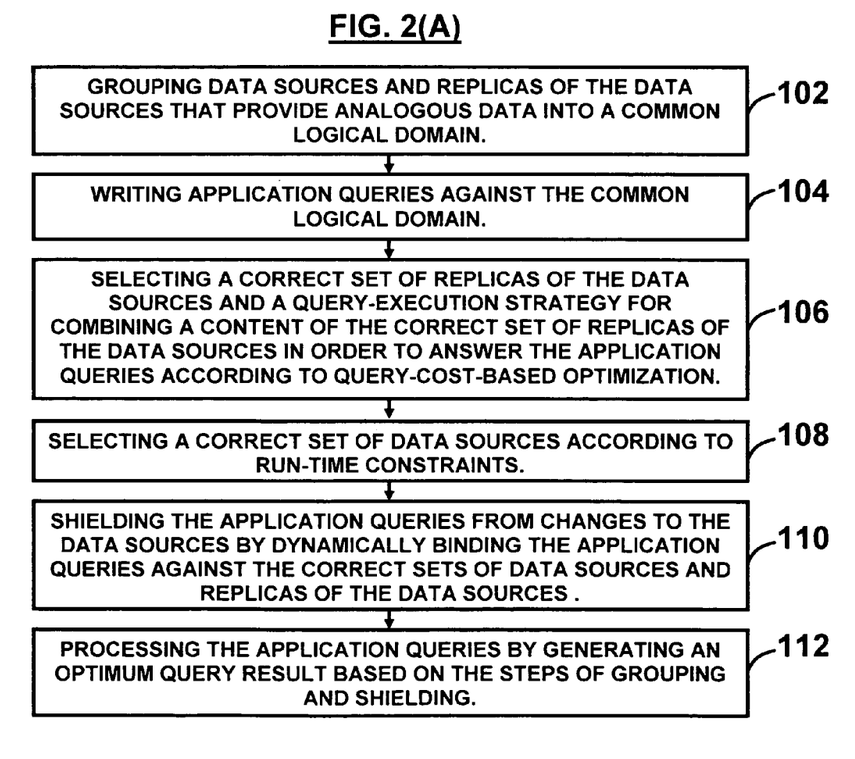
FIG. 2(A) is a flow diagram illustrating a preferred method according to an embodiment of the invention.

A first aspect of the invention is illustrated in the flow diagram of FIG. 2(A), which provides a method for integrating data in a database management system, wherein the method comprises grouping (102) data sources and replicas of the data sources that provide analogous data into a common logical domain; writing (104) application queries against the common logical domain; selecting (106) a correct set of replicas of the data sources and a query-execution strategy for combining a content of the correct set of replicas of the data sources in order to answer the application queries according to query-cost-based optimization; selecting (108) a correct set of data sources according to run-time constraints; shielding (110) the application queries from changes to the data sources by dynamically binding the application queries against the correct sets of data sources and replicas of the data sources; and processing (112) the application queries by generating an optimum query result based on the steps of grouping (102) and shielding (110).

Figure 2B:
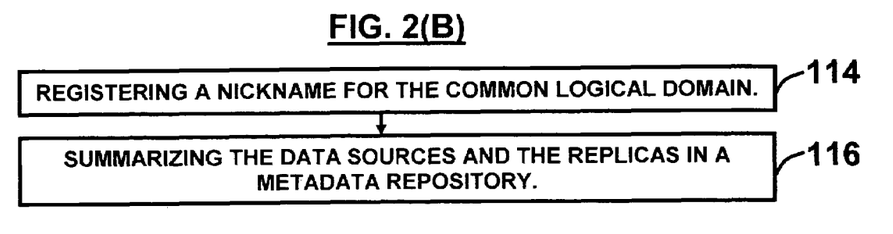
FIG. 2(B) is a flow diagram illustrating a preferred method according to another embodiment of the invention.

The data sources and the replicas comprise data distributed in a computer grid environment. Additionally, as illustrated in FIG. 2(B), the method further comprises registering (114) a nickname for the common logical domain and summarizing (116) the data sources and the replicas in a metadata repository, wherein the step of summarizing (116) is performed by a wrapper, wherein the wrapper dynamically contacts the metadata repository to asynchronously retrieve the correct set of data sources and replicas according to query predicates and quality-of-service (QOS) requirements, wherein the QOS requirements comprise tolerable data staleness factors.

The wrapper is adapted to allow a database optimizer to select the optimum query result according to the data source and replica performance, and availability of the data source and the replicas. Moreover, the method further comprises adapting the correct set of data sources and replicas after execution of the application queries has begun, wherein the adapting comprises completing the application queries with partially-completed results from available data sources, wherein the adapting comprises data source performance reduction factors, data source performance failure factors, and a percentage of the query processing that is completed, wherein the adapting comprises completing the processing of the query by automatically switching the data sources to replicas, wherein the adapting comprises tracking a provenance of the data sources and replicas used to answer the application queries.

Figure 7:
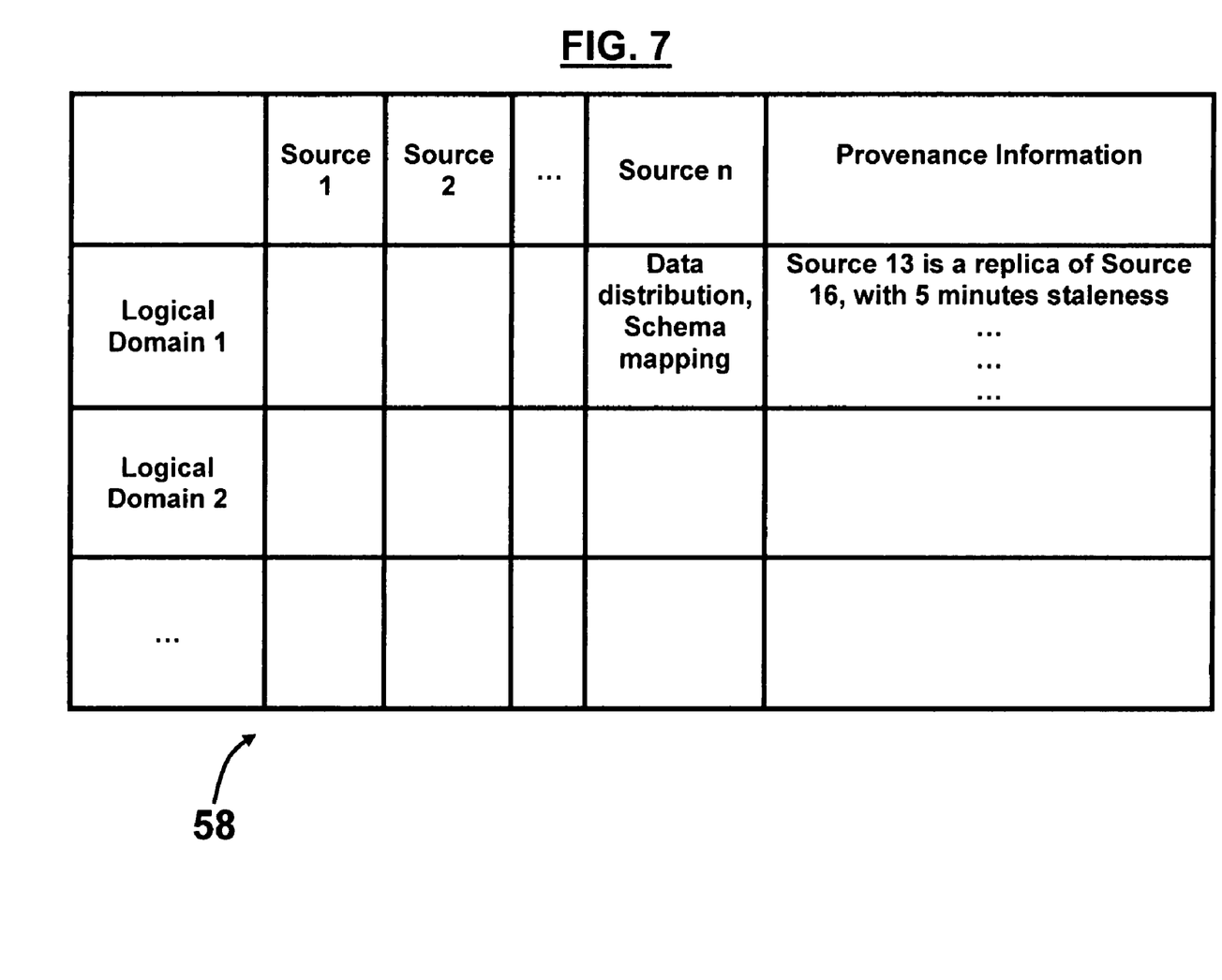
FIG. 7 is a schematic representation of the metadata repository of FIGS. 4 and 5 according to an embodiment of the invention.

A separate metadata repository 58 is shown in FIG. 7, which is used to track various types of information about data sources and replicas, including: (1) the set of data sources and replicas available in each logical domain; (2) data distributions for each source and replica. This is used by the MetaWrapper 54 (shown in FIG. 4) to choose the optimum set of data sources and replicas for each query. For example, a particular domain "CUSTOMERS" may have two data sources (CUSTOMERS_WESTERN_REGION and CUSTOMERS_EASTERN_REGION). If the data distribution information for CUSTOMERS_WESTERN_RE-GION says that the attribute "State of Residence" only takes values ('CA', 'WA', 'NV', 'UT'), then a query "Find customers where state='NY' and <some other conditions>" can be routed to CUSTOMERS_EASTERN_REGION alone, thereby achieving higher performance. The metadata repository 58 further includes a provenance of each replica. This indicates, for each replica, which source it is a replica of, and what is the staleness of information in this replica. This staleness is defined as the current time minus the time when the replica was last synchronized with the source. Moreover, this provenance information is updated in the metadata repository 58 by the replication management system (not shown).

Figure 3:
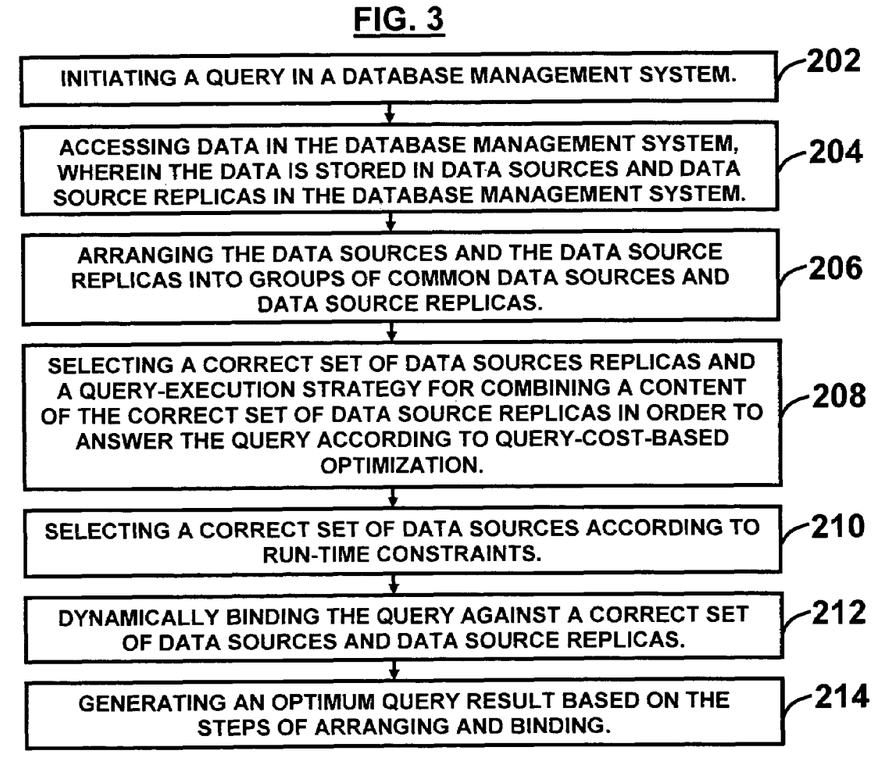
FIG. 3 is a flow diagram illustrating a preferred method according to another embodiment of the invention.

FIG. 3 illustrates a flowchart of another aspect of the invention. Specifically, FIG. 3 illustrates a method for processing a database query, wherein the method comprises initiating (202) a query in a database management system; accessing (204) data in the database management system, wherein the data is stored in data sources and data source replicas in the database management system; arranging (206) the data sources and the data source replicas into groups of common data sources and data source replicas; selecting (208) a correct set of data sources replicas and a query-execution strategy for combining a content of the correct set of data source replicas in order to answer the query according to query-cost-based optimization; selecting (210) a correct set of data sources according to run-time constraints; dynamically binding (212) the query against the correct sets of data sources and data source replicas; and generating (214) an optimum query result based on the steps of arranging (206) and binding (212).

The embodiments of the invention introduce the notion of a logical domain, which is defined as the set of all data sources (and replicas) that provide similar data and whose schemas can be mapped onto a common domain schema. For example, in a grid of patient records from multiple hospitals, even though the patient records may be spread across multiple hospital databases and their replicas, they can be viewed as belonging to single logical domain called "Patients". Applications write queries against this domain as in this example:
SELECT id, name, age, doctor FROM patients
WHERE age<2 and disease like '% stiff % neck %'

Such queries are then dynamically and selectively bound to the correct set of data sources and replicas. The sources are selectively chosen according to (a) the predicates in the query, and (b) the staleness tolerance of the application. In the above example, of the potentially many hospital databases on the grid, only $H_{17}$, $H_{25}$, $H_{53}$ may deal with infants and thereby meet the predicate requirements. Then, based on the QOS specified by the application, a replica (or master) of appropriate staleness is chosen.

Figure 4:
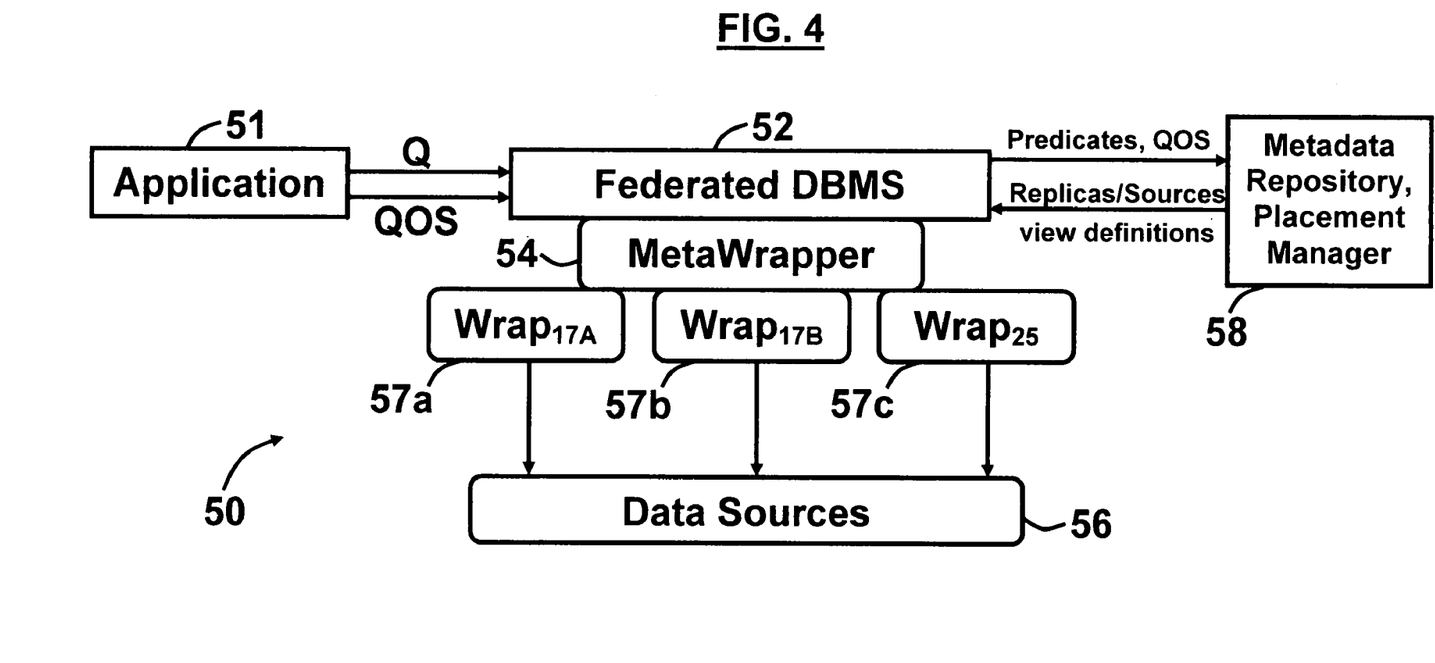
FIG. 4 is a schematic diagram of a query system according to an embodiment of the invention.

The challenge addressed by the embodiments of the invention is to perform this late binding from within the DBMS by contacting a metadata repository, determining the matching sources, and running the query as a union over these sources. At the same time, the embodiments of the invention consider replicas of these data sources by communicating with the placement manager 58 (shown in FIG. 4). Moreover, the embodiments of the invention address several other challenges:

For example, Cost-Based Replica Selection: One of the main drivers for the dynamic binding is replica selection. The placement manager 58 creates replicas of data sources according to the workload etc., and the replicas for both fault tolerance and better performance are factors to be exploited. However, this exploitation should be cost-based. For example, a heuristic solution of always going to the replica can turn out to be very bad if the replica is not as functional as the master or is running on a slower central processing unit (CPU). Even with homogenous DBMSs, different replicas could contain unions of different subsets of the tables in the query, so there is no simple heuristic to choose. Thus, it is desirable to involve the cost-based DBMS optimizer in the selection.

Another example involves Run-time Binding: In some applications the information needed to choose the source is not fully available at compile time. One reason for this is parameter markers. Another reason is that the replica chosen at compile time may now be overloaded or unavailable. Thus, it is desirable to have some flexibility in choosing sources just before query execution.

An additional example involves adaptation during query execution: In some cases it is desirable to adapt the set of sources even after the query has started executing. The simplest example of this is graceful degradation to failures. For example, when running a query over 15 hospitals if the connection to one hospital is lost 90% of the way through the query it is often preferable to finish the query with partial results from the available hospitals. More generally if a source fails at run-time it might be possible to complete the query by switching to a replica. Such operations produce only approximate results, with some missing answers or with duplicates. However, there is no correct answer for the query anyway, because the set of data sources is unspecified. Thus, the embodiments of the invention provide the best partial results. The embodiments of the invention address the above challenges by providing a source connector module called a MetaWrapper 54.

Specifically, to transparently access grid data sources and replicas, the embodiments of the invention provide a connector module called a MetaWrapper 54 that generally includes all data sources and replicas over a given logical domain. FIG. 4 illustrates a dynamic source binding system and technique through the MetaWrapper 54. Specifically, FIG. 4 illustrates a system 50 of integrating data, wherein the system 50 comprises a database management system 52 adapted to process a query (Q) received from an application 51 and generate an optimum query result; a wrapper module 54 adapted to receive the query (Q) and to send (via wrappers 57a, 57b, 57c) a request for data stored in data sources and data source replicas 56; and a metadata repository 58 adapted to arrange the data sources and the data source replicas into a list of common data sources and data source replicas, wherein the wrapper module 54 is configured for receiving the list from the metadata repository 58, wherein the wrapper module 54 is configured for dynamically binding the query (Q) against a correct set of data sources and data source replicas, wherein the correct set of data sources are selected according to run-time constraints, and wherein the correct set of data source replicas and a query-execution strategy for combining a content of the correct set of replicas of the data sources in order to answer the application queries are selected according to query-cost-based optimization, and wherein the list and the binding generate the optimum query result.

In the example above, the embodiments of the invention register "Patients" as a source using this MetaWrapper 54 (in the specific context of federated DBMSs following the SQL/MED standard, "Patients" would be registered as a foreign table or nickname). At this point, the embodiments of the invention assume that all of the actual sources and replicas are already registered in the catalog.

This is significant because the wrappers for the data sources (57a, 57b, 57c) expect that queries submitted to them for compilation will refer to specific collections of data at the data sources using the "nicknames" by which those data collections were registered with the federated DBMS 52, not by whatever names they are actually known by at the data sources. Thus the sources, and the data collections they contain, must be registered with the federated DBMS 52 before the MetaWrapper 54 attempts to process a query (Q) that might refer to them.

Figure 5:
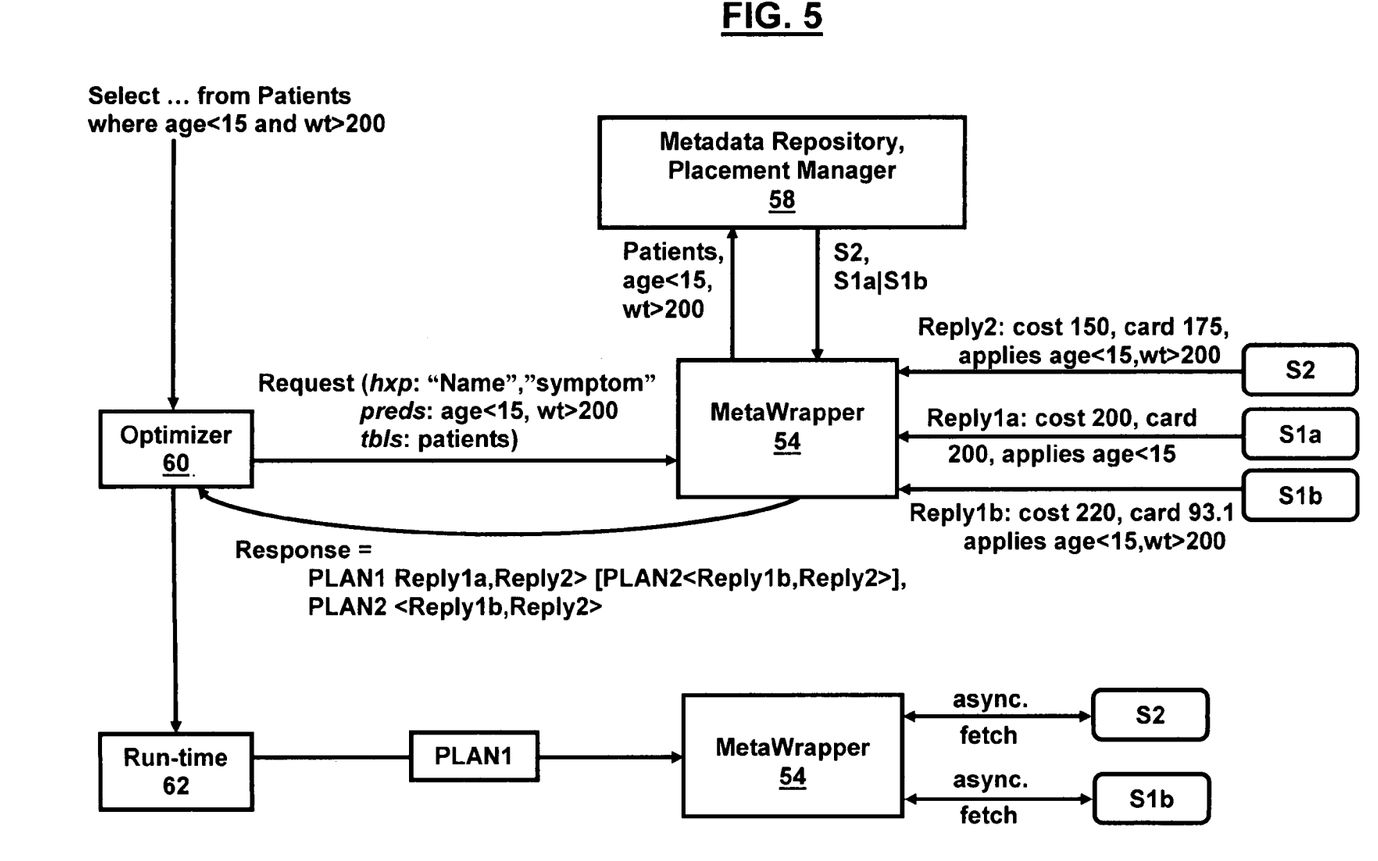
FIG. 5 is an example of data flow through a query system according to an embodiment of the invention.

With regard to the Compile-Time functioning of the MetaWrapper 54, at compile time, the MetaWrapper 54 mediates between the DBMS optimizer 60 (shown in FIG. 5) and the actual source wrappers 57a, 57b, 57c to choose an optimal query plan involving these wrappers. Generally, the optimizer 60 considers various ways of "pushing down" query fragments into the wrappers, and chooses the least expensive option. The DBMS 52 thinks that the MetaWrapper 54 is the wrapper for a single source called "Patients". FIG. 5 illustrates an example of the dataflow between the DBMS 52 and the MetaWrapper 54.

In operation, the DBMS optimizer 60 sends a Request to the MetaWrapper 54. The Request encapsulates a query fragment that the DBMS optimizer 60 wants the MetaWrapper 54 to consider executing. The query fragments include three parts: hxps are the head expressions or the SELECT expressions of the query fragment; preds are the predicates in the query fragment; and tbls are the tables or the FROM clause of the query fragment. In the example of FIG. 5, Request=<{'Name', 'Symptom'}, {age<15, wt>200}, 'Patients'>.

Next, the MetaWrapper 54 sends <Request.tbls, Request.preds> to the Metadata Repository 58, which in one example may be the Criollo Metadata Repository (CMR) and/or Placement Manager (PM), and receives a list of sources and replicas. For example, the CMR/PM 58 could return sources S1a, S1b, S2, with S1a and S1b being replicas. Thus, the query needs to do (S1a|S1b)∪ S2. As mentioned, the embodiments of the invention assume that wrappers for S1a, S1b, S2 are already registered. In addition the CMR/PM 58 also returns the view definitions S1a.view, S1b.view for mapping the schemas of the data sources into the schema of Patients. Each of these view definitions is in a parsed format (e.g. S1a.view is given as <S1a.hxps, S1a.preds, S1a.tbls>).

The MetaWrapper 54 now sends the original Request to S1a, S1b, S2. However, they have different schemas so MetaWrapper 54 rewrites the original Request according to schema mappings returned by the CMR/PM 58, as follows:

(1) All column references in the head expressions and predicates must be transformed to the source schema. This is performed by overriding the get_column_name, get_value, and get_nickname functions to perform the schema mapping.

(2) Request.preds=Request.preds ∪ S1a.preds.

(3) Request.tbls=S1a.tbls.

The MetaWrapper 54 now sends the modified Request to S1a, S1b, S2 and receives Reply1a, Reply1b, Reply2. These replies are a set of plans for executing the query fragment, with an associated Wrapper Execution Descriptor (WED) and cost and cardinality estimates for each plan. Each plan includes an actual query fragment that the wrapper can execute: <hxps ⊂ Request.hxps, preds ⊂ Request.preds, tbls ⊂ Request.tbls>.

Since S1a and S1b are replicas, two sets of plans are returned: those from S1a and those from S1b, and the optimizer 60 decides which to choose. Specifically, Reply1a is provided as a set of plans Reply1a={Reply1a$_1$, Reply1a$_2$, ...} and similarly provided for Reply1b and Reply2. The optimizer 60 receives a union of cross-products (Reply1a×Reply=2) ∪ (Reply1b×Reply2).

With regard to the construction of the replies each plan in the reply includes a pair of plans to access S1a (or S1b) and S2. Suppose these are <P$_1$.hxps, P$_1$.preds, P$_1$.tbls> for S1a and <P$_2$.hxps, P$_2$.preds, P$_2$.tbls> for S2. The overall Reply is formed as <P$_1$.hxps ∩ P$_2$.hxps, P$_1$.preds ∩ P$_2$.preds, P$_1$.tbls ∩ P$_2$.tbls>. Since a union function is being performed, the cost and cardinality estimate for the reply is set as cost=P$_1$.cost+P$_2$.cost and card=P$_1$.card+P$_2$.card.

The WED for this reply would normally include the WED of P$_1$ and the WED of P$_2$ only. However, the sources would be unable to change from S1a to S1b at run-time. Thus, the embodiments of the invention also store the WEDs and Replies of all the loser plans. These loser plans are plans involving S1b that are at least as powerful as the winner plan P$_1$ in terms of predicates, head expressions, and tables applied, but with a higher cost, otherwise they would have been chosen at compile-time itself.

With regard to the run-time functioning of the MetaWrapper 54, during query execution the MetaWrapper 54 passes fetch requests to the wrapper of the chosen replica. In case there is more than one source, it unions the records from the source wrappers by alternately calling fetch on them. In this context, the term "calling fetch on them" refers to asking the MetaWrapper 54 for a data source to produce the next record in the set it is computing in response to the query that was submitted to it.

Furthermore, the embodiments of the invention store data regarding alternative non-optimum query execution strategies and sets of replicas of data sources that may become optimal query execution strategies and sets of replicas of data sources after compile time is completed and gather access statistics during execution of the processing to guide future replication of the data. Referring to FIG. 5, the selected plan, PLAN1, includes as an alternative PLAN2, which obtains information from alternate source S1b instead of source S1a. This substitution is permitted because Reply 1b in PLAN2 is at least as selective as Reply 1a in PLAN1. However, PLAN1 is not saved as an alternative to PLAN2, because PLAN1 is not as selective as PLAN2. If the optimizer 60 of the federated database manager 52 were to choose PLAN2, then the run-time engine 62 would expect the predicate "wt>200" to have been applied by the data source, as indicated in Reply 1b. Moreover, the optimizer 60 cannot switch to PLAN1, because the source does not apply this predicate in Reply 1a. As to the gathering of access statistics during execution, this would be a function of the MetaWrapper 54, which would store the statistical information in the Metadata Repository 58. As indicated at the bottom of FIG. 5, the MetaWrapper 54 processes the stream of information returned from sources S2 and S1b, and is thus in a position to note the precise size and statistical composition of the result, which may differ from the estimates provided during query compilation.

The run-time component of the MetaWrapper 54 can also perform several optimizations. First, run-time source selection: if at run-time the chose replica happens to be unavailable or too slow, the MetaWrapper 54 considers the loser plans stored in the WED to check if those replicas are available or faster. In general, the MetaWrapper 54 can even contact the Metadata Repository 58 again for new sources and replicas. The wrappers for these new sources support the same query fragment that was accepted at compile-time. This is verified by retaining a copy of the Request object from the original compilation. If no such source exists, the MetaWrapper 54 returns an error that the chosen plan is unexecutable. The preferred option in this case is to re-optimize the query.

Second graceful degradation: when unioning results from multiple sources one of them can fail during execution. The MetaWrapper 54 could choose to gracefully degrade to such failures by continuing the query with the results from the remaining sources. This assumes that the application is willing to tolerate partial results. However, in the grid context, the application does not specify the sources in its query at all. Thus, there is no well-defined notion of complete results. In fact, if there is a "select distinct" in the query plan somewhere above the MetaWrapper 54, it can adapt to failure by dynamically choosing another replica, and not lose any results.

Third, asynchrony and parallelism: since the MetaWrapper 54 is a separate module, it has much flexibility in how it performs the union across the different data sources. For example, it can issue fetch requests to multiple data sources at a time and receives results asynchronously (via separate threads). This ensures that the entire query will not be slowed down because of one slow source, thereby enhancing the interactive response. It also provides parallelism across the sources.

Fourth, dynamic provisioning: since all queries to a domain go through the MetaWrapper 54, it has complete knowledge of the frequency of accesses to tuples within a domain. For example in the "Patients" domain, the MetaWrapper 54 may notice that 60% of the queries are for patients with age<15. This is much more finely-grained than what would be seen from the statement cache alone. For example, parameter markers and values of bind-variables are not available in the original SQL statement but are available to the MetaWrapper 54. The MetaWrapper 54 can periodically provide this finely-grained access statistics to the placement manager as advice for future replication.

Figure 6:
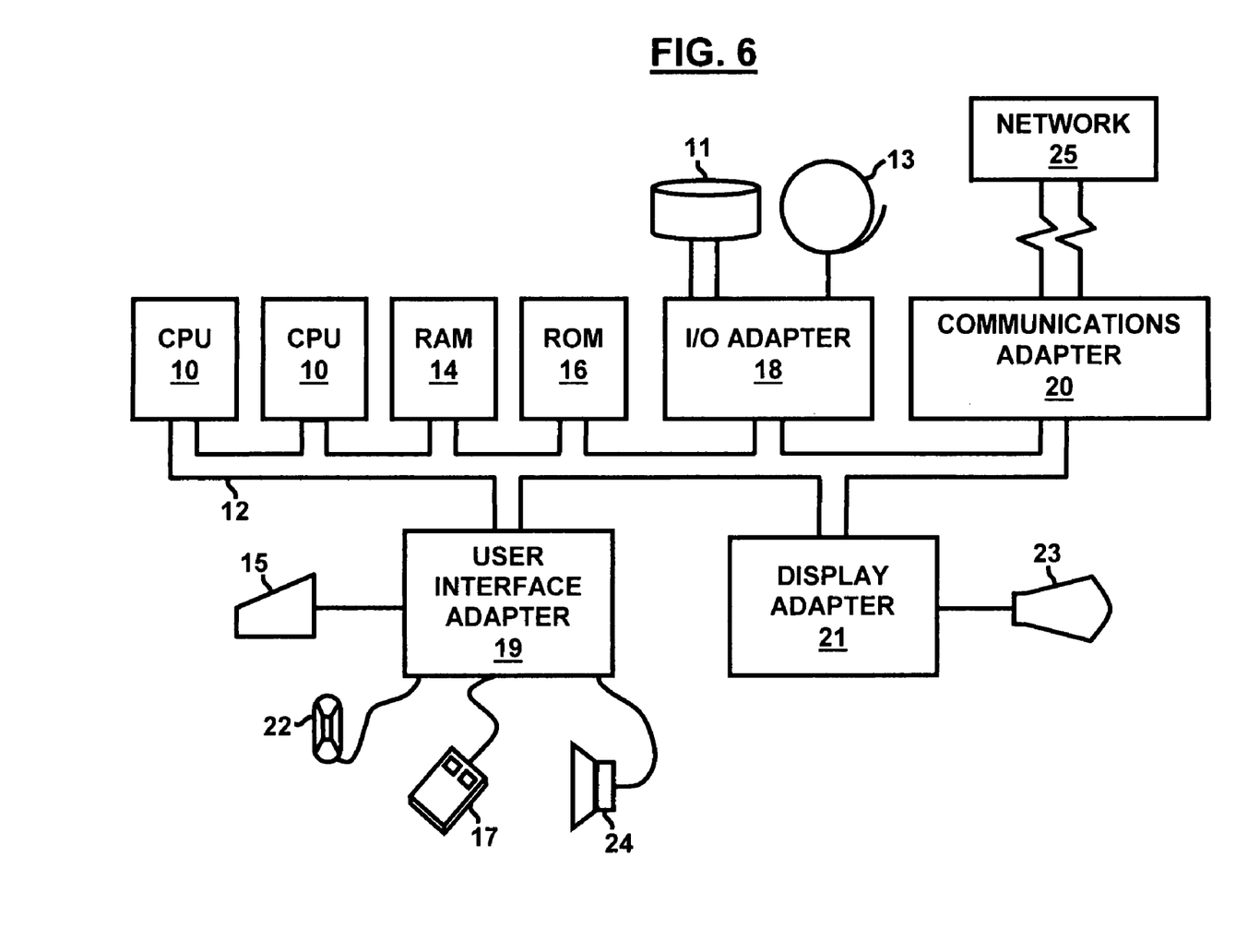
FIG. 6 is a computer system diagram according to an embodiment of the invention.

A representative hardware environment for practicing the embodiments of the invention is depicted in FIG. 6. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Generally, the embodiments of the invention provide a logical domain as a union of all data sources and replicas providing similar content. Application queries are then written against this logical domain. The logical domain is registered as a nickname backed by a new federated wrapper called a MetaWrapper 54, which abstracts all data sources and replicas under the domain. The actual sources and replicas are registered in a separate metadata repository 58, which sits on a separate node from the DBMS 52. The application is hidden from source dynamism because it views the entire domain as a single table. The MetaWrapper 54 dynamically contacts the metadata repository with the query predicates and QOS requirements to fetch the correct set of replicas and sources.

Since wrappers have both compile-time and run-time components, this source/replica selection can be changed even at run-time. At compile-time, the MetaWrapper 54 mediates the Request/Reply/Compensate protocol between the database and the actual source wrappers 57a, 57b, 57c. The MetaWrapper 54 has no optimization logic, but exposes all plans involving the remote sources and replicas so that the database optimizer can choose the best one. Even though the overall plan is fixed after compile-time, the MetaWrapper 54 still has flexibility to change sources/replicas at run-time as long as the new source can perform the same query fragment accepted at compile-time. The run-time component of the MetaWrapper 54 redirects fetch requests to the wrappers 57a, 57b, 57c of each of the matching sources. These fetches are performed asynchronously for parallelism and for graceful degradation to failures.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A method for integrating data in a database management system, said method comprising:
    grouping data sources and replicas of said data sources that provide analogous data into a common logical domain, wherein said data sources and said replicas comprise data distributed in a computer grid environment;
    registering a nickname for said common logical domain;
    summarizing, using a wrapper, said data sources and said replicas in a metadata repository, wherein said wrapper dynamically contacts said metadata repository to asynchronously retrieve said correct set of data sources and replicas according to query predicates and quality-of-service (QOS) requirements, wherein said QOS requirements comprise tolerable data staleness factors;
    writing application queries against said common logical domain;
    selecting a correct set of replicas of said data sources and a query-execution strategy for combining a content of said correct set of replicas of said data sources in order to answer said application queries according only to query-cost-based optimization;
    selecting a correct set of data sources according to run-time constraints, wherein said query-execution strategy comprise reply plans for executing said query and storing data regarding all alternative non-optimum query execution strategies and sets of replicas of data sources that may become optimal query execution strategies and sets of replicas of data sources after compile time is completed, wherein said non-optimum query execution strategies are generated based on data sources other than said correct sets of data sources, and wherein a non-optimum query execution strategy comprises a reply plan that is at least as selective as a reply plan contained in said query-execution strategy;
    adapting said correct set of data sources and replicas after execution of said application queries has begun, wherein said adapting comprises (i) completing said application queries with partially-completed results from available data sources, (ii) completing said processing of said query by automatically switching said data sources to said replicas, and (iii) tracking a provenance of said data sources and replicas used to answer said application queries;
    shielding said application queries from changes to said data sources by dynamically binding said application queries against the correct sets of data sources and replicas of said data sources; and
    processing said application queries by generating an optimum query result based on said grouping and said shielding; and
    gathering access statistics during execution of said processing to guide future replication of said data,
    wherein said wrapper is adapted to allow a database optimizer to select said optimum query result according to said data source and replica performance, and availability of said data source and said replicas.

2. A program storage device readable by a computer, tangibly embodying a program of instructions executable by said computer to perform a method for integrating data in a database management system, said method comprising:
    grouping data sources and replicas of said data sources that provide analogous data into a common logical domain, wherein said data sources and said replicas comprise data distributed in a computer grid environment;
    registering a nickname for said common logical domain;
    summarizing, using a wrapper, said data sources and said replicas in a metadata repository, wherein said wrapper dynamically contacts said metadata repository to asynchronously retrieve said correct set of data sources and replicas according to query predicates and quality-of-service (QOS) requirements, wherein said QOS requirements comprise tolerable data staleness factors;
    writing application queries against said common logical domain;
    selecting a correct set of replicas of said data sources and a query-execution strategy for combining a content of said correct set of replicas of said data sources in order to answer said application queries according only to query-cost-based optimization;
    selecting a correct set of data sources according to run-time constraints, wherein said query-execution strategy comprise reply plans for executing said query and storing data regarding all alternative non-optimum query execution strategies and sets of replicas of data sources that may become optimal query execution strategies and sets of replicas of data sources after compile time is completed, wherein said non-optimum query execution strategies are generated based on data sources other than said correct sets of data sources, and wherein a non-optimum query execution strategy comprises a reply plan that is at least as selective as a reply plan contained in said query-execution strategy;

adapting said correct set of data sources and replicas after execution of said application queries has begun, wherein said adapting comprises (i) completing said application queries with partially-completed results from available data sources, (ii) completing said processing of said query by automatically switching said data sources to said replicas, and (iii) tracking a provenance of said data sources and replicas used to answer said application queries;

shielding said application queries from changes to said data sources by dynamically binding said application queries against the correct sets of data sources and replicas of said data sources; and processing said application queries by generating an optimum query result based on said grouping and said shielding; and gathering access statistics during execution of said processing to guide future replication of said data, wherein said wrapper is adapted to allow a database optimizer to select said optimum query result according to said data source and replica performance, and availability of said data source and said replicas.

3. A system of processing a database query, said system comprising:

means for grouping data sources and replicas of said data sources that provide analogous data into a common logical domain, wherein said data sources and said replicas comprise data distributed in a computer grid environment;

means for registering a nickname for said common logical domain;

means for summarizing, using a wrapper, said data sources and said replicas in a metadata repository, wherein said wrapper dynamically contacts said metadata repository to asynchronously retrieve said correct set of data sources and replicas according to query predicates and quality-of-service (QOS) requirements, wherein said QOS requirements comprise tolerable data staleness factors;

means for writing application queries against said common logical domain;

means for selecting a correct set of replicas of said data sources and a query-execution strategy for combining a content of said correct set of replicas of said data sources in order to answer said application queries according only to query-cost-based optimization;

means for selecting a correct set of data sources according to run-time constraints, wherein said query-execution strategy comprise reply plans for executing said query and storing data regarding all alternative non-optimum query execution strategies and sets of replicas of data sources that may become optimal query execution strategies and sets of replicas of data sources after compile time is completed, wherein said non-optimum query execution strategies are generated based on data sources other than said correct sets of data sources, and wherein a non-optimum query execution strategy comprises a reply plan that is at least as selective as a reply plan contained in said query-execution strategy;

means for adapting said correct set of data sources and replicas after execution of said application queries has begun, wherein said adapting comprises (i) completing said application queries with partially-completed results from available data sources, (ii) completing said processing of said query by automatically switching said data sources to said replicas, and (iii) tracking a provenance of said data sources and replicas used to answer said application queries;

means for shielding said application queries from changes to said data sources by dynamically binding said application queries against the correct sets of data sources and replicas of said data sources; and processing said application queries by generating an optimum query result based on said grouping and said shielding; and means for gathering access statistics during execution of said processing to guide future replication of said data, wherein said wrapper is adapted to allow a database optimizer to select said optimum query result according to said data source and replica performance, and availability of said data source and said replicas.

* * * * *